Dec. 4, 1956  E. R. GAMBERG ET AL  2,772,989
TREATED WIRE FOR ARC WELDING ELECTRODES
Filed Jan. 19, 1953

WITNESSES:
John E. Hanley
Leon J. Taja

INVENTORS
Edward R. Gamberg &
Howard C. Ludwig
BY
Hyman Diamond
ATTORNEY

United States Patent Office 2,772,989
Patented Dec. 4, 1956

2,772,989

TREATED WIRE FOR ARC WELDING ELECTRODES

Edward R. Gamberg, Irwin, and Howard C. Ludwig, Pittsburgh, Pa., assignors to Westinghouse Electric Corporation, East Pittsburgh, Pa., a corporation of Pennsylvania Application January 19, 1953, Serial No. 331,884

14 Claims. (Cl. 117—204)

Our invention relates to arc welding and has particular relation to arc welding electrodes. The invention disclosed in this application resulted from our work on the inventions disclosed in applications Serial No. 286,348, filed May 6, 1952, Serial No. 324,473, filed December 6, 1952, both to Howard C. Ludwig and both assigned to Westinghouse Electric Corporation.

Our invention specifically concerns itself with arc welding with a flux covered electrode in open air as distinct from arc welding with a bare electrode in a shield of inert gas. It has long been a problem in arc welding in open air to improve the transfer of metal across the arc. It is desirable that the transfer be more uniform and more concentric than it is when the welding is in accordance with the teachings of the prior art and that the metal spread and the metal wash be improved over that attainable by following the teachings of the prior art. It is also desirable that the metal be transferred in smaller droplets than at present.

To an extent improved operation was achieved in the past with flux coated wires of high carbon steel but the use of such high-carbon electrodes has in many situations proven detrimental to the work being welded. Since it is undesirable to segregate steel core wires into low-carbon and high-carbon categories in accordance with the properties of the work being welded, the use of the high carbon steel electrode was to a large extent abandoned.

It is accordingly a broad object of our invention to improve the metal transfer and particularly the metal spread and the metal wash in arc welding in open air with a flux covered consumable electrode.

In its more specific aspects, our invention arises from the realization that an increase in the arc voltage at which an electrode operates results in an improvement in the metal transfer which is marked even for a small increase in the arc voltage. We have conceived that the desired increase may be obtained by properly treating the welding electrode.

It is accordingly a specific object of our invention to provide a consumable welding electrode particularly for use in welding in open air as distinct from welding in an inert gas which electrode shall operate with an arc of a higher voltage than prior art electrodes.

Another specific object of our invention is to provide a welding electrode for welding in open air, the use of which shall improve the transfer of the metal across the arc.

A further specific object of our invention is to provide a welding electrode for welding in open air which shall in use produce improved metal spread and metal wash.

Still another specific object of our invention is to provide a welding electrode for welding in open air in the use of which the uniformity of the transfer of metal and the concentricity of the transfer of metal shall be improved.

A still further specific object of our invention is to provide a welding electrode for welding in open air in the use of which the melted metal shall be delivered in a fine spray.

In accordance with our invention we provide a welding electrode having a flux coating which electrode is characterized by a thin layer of an arc stabilizing compound between the wire and the flux coating. The thickness of the coating of the arc stabilizing layer should be just sufficient to maintain the arc stabilized taking into consideration the diameter of the electrode and the rate at which it is to be consumed. The quantity of layer material available for stabilization increases with the diameter of the electrode; the quantity of layer material necessary for stabilization increases with the rate of consumption of the electrode.

It is essential that the stabilizing layer should be intimately associated with the metallic portion of the electrode wire. This object may be achieved by properly coating the wire either chemically or mechanically. For example the wire may be oxidized or it may be coated with a suitable paint. Regardless of the manner of applying the stabilizing coating it should be so disposed relative to the wire that its stabilization influence is effective. It is to be realized that compounds similar to those which we have found to produce effective stabilization have for many years in the past been included in the flux coating without having the influence observed with wires in accordance with our invention, in which the compounds are applied in layers on the wire and intimately associated with it.

The novel features that we consider characteristic of our invention are set forth generally above. The invention itself, however, both as to its organization and its method of operation, together with additional objects and advantages thereof will best be understood from the following description of a specific embodiment when read in connection with the accompanying drawing in which.

Figure 1:
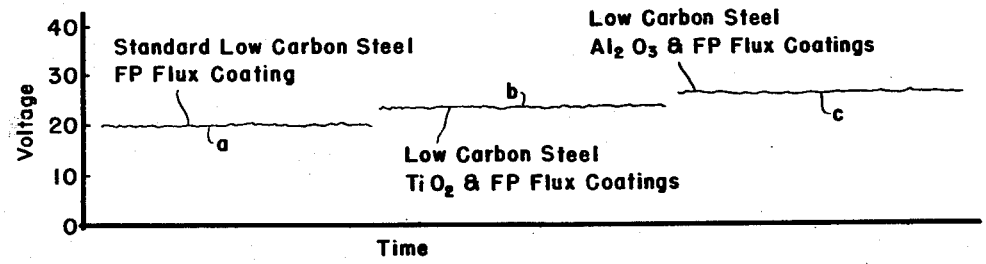
Figure 1 is a graph showing how an electrode in accordance with our invention produces improved operation.

In the following table various properties of a number of electrodes in accordance with our invention, which we have made and with which we have produced satisfactory welds are presented. Each of these electrodes included a core wire, a stabilizing layer and a flux coating which are specified in the table. The table also includes certain of the important properties of the apparatus with which the welds were produced.

| Composition electrode wire | Stabilizing compound | Flux coating | How stabilizing compound is applied | Thickness of stabilizing compound—Inches where not stated as mg. per ft. | Particle size | Diameter of wire, inches | Polarity | Work |
|---|---|---|---|---|---|---|---|---|
| Low carbon mild steel. | Fe₃O₄ | LoH-2 | Chemically | Few mg. per ft. | | 5/32 | Reverse | Mild steel Westinghouse 2001. |
| Do | Fe₃O₄ | AP | do | do | | 5/32 | do | Do. |
| Do | Fe₃O₄ | SW | do | do | | 5/32 | Straight | Do. |
| Do | Fe₃O₄ | FP | do | do | | 5/32 | do | Do. |
| Do | Fe₃O₄ | DH | do | do | | 5/32, 7/32 | Straight and reverse. | Do. |
| Do | Fe₃O₄ | DH | Extrusion | .001 to .0015 | 40X down | 5/32, 7/32 | do | Do. |
| Do | Al₂O₃ | AP | do | .005 | | 1/8 | Reverse | Do. |
| Do | Al₂O₃ | FP | do | .005 | | 1/8 | Straight | Do. |
| Do | TiO₂ (rutile) | AP | do | .005 | 100X down | 1/8 | Reverse | Do. |
| Do | do | FP | do | .005 | do | 1/8 | Straight | Do. |
| Do | TiO₂ (pigment grade) | AP | Painting | <.001 | 1 micron | 1/8 | Reverse | Do. |
| Do | do | FP | do | | | 1/8 | Straight | Do. |
| 60% Ni–40% Fe | do | Freemachineweld-60. | do | | | 5/32 | Reverse | Cast iron. |
| Low carbon mild steel. | Phosphate | AP | Chemically | | | 1/8 | Straight | Mild steel Westinghouse 2001. |
| Nickel grade A | do | Freemachineweld-60. | do | | | 1/8 | Reverse | Cast iron. |
| 60% Ni–40% Fe | do | do | do | | | 1/8 | do | Do. |

When any thicker than .001 coating there was too much Fe₃O₄ in the reaction.

The left hand column of this table gives the composition of the wires which were used. To a large extent the wires were of low carbon mild steel but 60% nickel wire and grade A nickel wire were also used. While in its specific aspects our invention involves wires of the above types, our invention, in its broader aspects may also be produced with wires of other compositions, for example, aluminum and its alloys and copper and its alloys.

In the second column the arc stabilizing compound is given. As can be seen the principal compounds used in the practice of our invention for stabilization are ferroso-ferric oxide ($Fe_3O_4$), aluminum oxide ($Al_2O_3$), titanium dioxide ($TiO_2$), in the form of rutile and also titanium dioxide of pigment grade and phosphates.

In the third column, the flux coatings are given. The following flux coatings were used as shown LoH-2, AP, SW, FP, DH, and Freemachineweld-60. The AP, SW, FP, DH and LoH-2 flux coatings correspond to American Welding Society coatings as follows:

AP ---------------------------------- E6010
SW ---------------------------------- E6013
FP ---------------------------------- E6012
DH ---------------------------------- E6020
LoH-2 ------------------------------- E7016

The AP, SW, FP and DH coatings are described in Tentative Specifications for Mild Steel Arc-Welding Electrodes ASTM Designation A 233–48T, AWS Designation A 5.1–48T (pages 11 through 18). The other flux is described in Tentative Specifications for Low Alloy Steel Arc-Welding Electrodes ASTM Designation A 316–48T, AWS Designation A 5.5–48T (pages 15 and 16).

The fourth column presents the manner in which the stabilizing compound was applied. The ferroso-ferric oxide was applied chemically and by extrusion. The aluminum and rutile titanium-dioxide compounds were applied by extrusion. The pigment grade titanium dioxide was applied by painting and the phosphate was applied chemically.

In applying the ferroso-ferric oxide chemically to the wire several processes could be adopted. The wire could be heated in an oxidizing atmosphere or it could be chemically treated in an oxidizing salt bath. The chemical treatment which has thus far proved most practical is disclosed in detail in the above mentioned Ludwig application Serial No. 286,328. It is known in the art as E. F. Houghton Company's "Houghto Black 15." It is to be understood, of course, that our invention is not limited to any specific manner of applying ferroso-ferric oxide to wire chemically.

The phosphate is applied chemically by bonderizing treatments which are known in the art and the essential features of which are disclosed in the above mentioned Ludwig application Serial No. 324,473.

The aluminum oxide is extruded on the wire from a plastic mass consisting essentially of aluminum oxide, 2% bentonite, 2% #865 silicate ($K_2SiO_4$) and sufficient water to produce the plastic mass. The wire coated with this extrusion is baked at 300° F. sufficiently to remove the water and then the flux coating is extruded on it. The bentonite operates as a slip agent permitting the particles to slip relative to each other so that the material passes through the extruding die readily. The silicate operates partly as a binder and partly as a slip agent. Other slip agents such as graphite or talc may also be used, and other binders such as dextrine, molasses, carboxymethocel, or gum arabic may be used.

The rutile is extruded on the wire in the same manner as the aluminum oxide, and after the wire is baked, the flux coating is extruded on it. The titanium dioxide of pigment grade is applied as a paint. The paint selected, in the case of the electrode enclosed in the table, was identical to the enamel used on refrigerator door panels. The painted wire is baked at 300° F. and then the flux coating is extruded on it.

In the fifth column or table the various thicknesses of the stabilizing layers are given to the extent that these are known. It was found that for the diameter of wire used that the ferroso-ferric oxide layer should not be substantially greater than .001 inch because a layer of thickness greater than .001 produces an excess of stabilizing compound beyond that necessary for proper reaction.

The sixth column presents the size of the particles of the stabilizing layer to the extent that these sizes are available. The seventh column presents the diameter of the wire and the eighth column, the polarity at which welding takes place with the wires. It is to be noted that the flux coating determines the polarity. The ninth column presents the work on which the welds were produced.

With all of the electrodes tabulated, sound welds were produced. The welding, as a general rule, took place at a substantially higher arc voltage than with prior art electrodes and the metal spread and metal wash was improved. The metal was transferred more uniformly and with greater concentricity than with prior art electrodes and the metal was deposited in a fine spray.

In Fig. 1, sections of an oscillograph of the arc voltage produced (a) with a standard prior art low carbon steel electrode, (b) with a low carbon steel electrode in accordance with our invention, having a layer of titanium dioxide between the wire and the flux coating and (c) with a low carbon steel electrode in accordance with our invention, having a layer of aluminum oxide between the wire and the flux. It is seen that the titanium dioxide electrode has a higher arc voltage by several volts than the standard prior art electrode and the aluminum oxide electrode has a still higher arc voltage. We have found that the increased arc voltage produces improved metal transfer.

Figure 2:
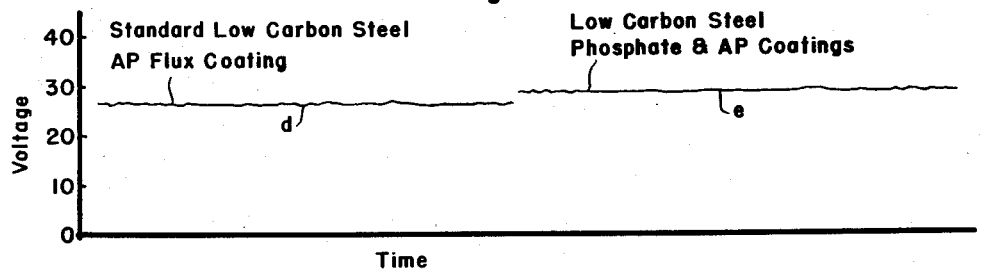
Fig. 2 is another graph showing how another electrode in accordance with our invention produces improved operation.

In Fig. 2 the same comparison is shown for a low carbon steel standard electrode and such an electrode having a stabilizing phosphate layer. Again the arc voltage is increased.

Figure 3:
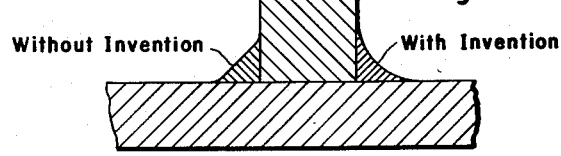
Fig. 3 is a diagram of a T joint comparing welds produced respectively with an electrode in accordance with our invention and with an electrode in accordance with the prior art.

In Fig. 3, on the left, a T weld produced with a prior art electrode is shown and on the right a T weld produced with an electrode in accordance with our invention is shown. It is seen that the latter weld is far superior to the former as regards metal wash and metal spread.

Figure 4A:
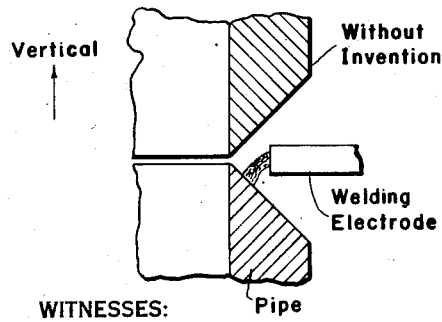
Figs. 4A and 4B are diagrams showing the manner in which electrodes in accordance with our invention produce improved operation as compared to prior art electrodes.

In Fig. 4A, there is a reproduction of the operation of welding a portion of a pipe with a prior art welding electrode. In this case the arc has a tendency to project the metal towards the lower section of the pipe.

Figure 4B:
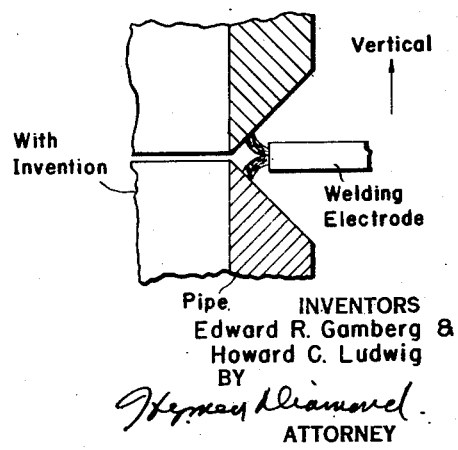

In Fig. 4B, there is a reproduction of the welding of a pipe with an electrode in accordance with our invention. In this case the arc is said to be substantially concentric.

While we have shown and described certain specific embodiments of our invention, many modifications thereof are possible. Our invention, therefore, is not to be restricted except insofar as is necessitated by the spirit of the prior art.

We claim as our invention:

1. A consumable welding electrode particularly for use in welding in open air as distinct from welding in an inert gas atmosphere consisting of a homogeneous metallic wire core selected from the group consisting of iron, nickel, and alloys consisting essentially of iron and nickel having on its surface a layer only of a dissociable oxygen containing arc stabilizing compound selected from the class consisting of metal oxides and metal phosphates, said layer having on its surface a flux coating which during the welding operation prevents oxidation of the weld, the compound being in intimate contact with the surface of the core and being present in sufficient thickness to stabilize the arc without producing oxidation of the weld considering the diameter of the core.

2. An electrode according to claim 1 characterized by the fact that the stabilizing compound is chemically applied to the wire.

3. A ferrous electrode according to claim 1 characterized by the fact that the stabilizing compound is ferroso-ferric oxide.

4. A ferrous electrode according to claim 1 characterized by the fact that the stabilizing coating is aluminum oxide ($Al_2O_3$).

5. A ferrous electrode according to claim 1 characterized by the fact that the stabilizing layer comprises one compound selected from the group consisting of ferroso-ferric oxide, aluminum oxide ($Al_2O_3$), titanium dioxide and a metal phosphate.

6. A ferrous electrode according to claim 1, characterized by the fact that the wire is of low carbon mild steel having a diameter of the order of 5/32", the compound is ferroso-ferric oxide chemically applied to a thickness of the order of a few milligrams per foot of wire and the flux coating comprises any one selected from the group consisting of LoH-2, AP, SW, FP and DH.

7. A ferrous electrode according to claim 1, characterized by the fact that the wire is low carbon mild steel having a diameter of the order of 1/8", the compound is $Al_2O_3$ having a thickness of the order of .005 inch and the flux coating comprising one of the group consisting of AP and FP.

8. A ferrous electrode according to claim 1, characterized by the fact that the wire is of low carbon mild steel having a diameter of the order of 5/32", the compound is ferroso-ferric oxide chemically applied to a thickness less than .001 inch and the flux coating comprises any one selected from the group consisting of LoH-2, AP, SW, FP and DH.

9. A ferrous electrode according to claim 1 characterized by the fact that the wire is low carbon mild steel having a diameter of the order of 1/8", the compound is $TiO_2$ having a thickness of the order of .005 inch and the flux coating comprises one of the group consisting of AP and FP.

10. A ferrous electrode according to claim 1 characterized by the fact that the wire is low carbon mild steel having a diameter of the order of 1/8", the compound is $TiO_2$ having a thickness of the order of .001 inch and the flux coating comprises one of the group consisting of AP and FP.

11. A welding electrode according to claim 1 characterized by the fact that the wire is 60% Ni-40% Fe, the coating is $TiO_2$ and the flux is Free-machineweld-60.

12. A welding electrode according to claim 1 characterized by the fact that the wire is low carbon mild steel, the coating is phosphate and the flux is AP.

13. A welding electrode according to claim 1 characterized by the fact that the wire is nickel, the coating is phosphate and the flux is Free-machineweld-60.

14. A welding electrode according to claim 1 characterized by the fact that the wire is 60% Ni-40% Fe, the coating is phosphate and the flux is Free-machineweld-60.

References Cited in the file of this patent
UNITED STATES PATENTS

| | | |
|---|---|---|
| 1,738,246 | Holt | Dec. 3, 1929 |
| 1,936,348 | Castle | Nov. 21, 1933 |
| 1,936,349 | Castle | Nov. 21, 1933 |
| 1,965,555 | Miller | July 3, 1934 |
| 2,010,605 | Miller | Aug. 6, 1935 |
| 2,021,628 | Larson | Nov. 19, 1935 |
| 2,043,927 | Kronback | June 9, 1936 |